United States Patent Office 2,794,039
Patented May 28, 1957

2,794,039

TREATMENT OF HYDROCARBON SYNTHESIS CATALYST

William C. Lake, Tulsa, Okla., assignor to Pan American Petroleum Corporation, a corporation of Delaware No Drawing. Application March 15, 1954,
Serial No. 416,403

10 Claims. (Cl. 260—449.6)

The present invention relates to the synthesis of hydrocarbons and oxygenated organic compounds by the reaction of carbon monoxide with hydrogen. More particularly, it is concerned with a method for altering the distribution of oxygenated chemicals produced in the aforesaid synthesis.

In carrying out hydrocarbon synthesis by means of convention techniques in the presence of known catalysts, the total quantity of chemicals ordinarily produced (both oil- and water-soluble chemicals) amounts to from about 12 to about 13 percent, based on the quantity of carbon monoxide converted. Under such circumstances, the distribution of chemicals in the water layer is substantially as follows (given on the basis of carbon atoms); 49 percent alcohols, 32 percent carbonyls (aldehydes and ketones), and about 19 percent acids. For the oil layer the distribution of chemicals on the same basis is 36 percent alcohols, 43 percent carbonyls, and about 21 percent acids. While the percentage of alcohols obtained in both the oil- and water-soluble fractions produced in hydrocarbon synthesis is rather substantial, it will likewise be noted that the proportion of the less desirable carbonyl compounds is also appreciable. Inasmuch as alcohols are genearlly more in demand than the carbonyl compounds produced in hydrocarbon synthesis, it has been a problem of investigators in this field to discover a means by which the ratio of alcohols to carbonyls could be increased.

I have now discovered a method by which it is possible to effect a substantial increase in the proportion of alcohols found in both the water and oil phases produced during hydrocarbon synthesis. Such discovery is particularly true with respect to ethanol and 1-propanol. Briefly the process of my invention comprises contacting the hydrocarbon synthesis catalyst with gaseous formaldehyde and thereafter using the catalyst thus treated in a conventional hydrocarbon synthesis operation. Contact of the catalyst with formaldehyde may be prior to or during the synthesis step and the period of treatment with formaldehyde need only be for a relatively short interval, after which synthesis under conventional conditions may be resumed. However, when analysis of the oil and water phases indicates a substantial decrease in the proportion of alcohols being produced, the treatment should be repeated. This can be accomplished without interupting normal synthesis operations merely by adding sufficient formaldehyde to the total feed stream to yield a final mixture containing formaldehyde in the desired concentration. From my observations, however, it appears that the effect of formaldehyde on hydrocarbon synthesis catalyst is to some extent cumulative, i. e., the percent selectively to alcohols increases slightly when the initial treatment of the catalyst with formaldehyde is followed within a fairly short time by additional treatments. Accordingly, the frequency with which the catalyst is treated is not great and desirable effects of a single treatment may last for a period of several weeks.

Generally, I prefer to employ from about 0.1 to about 1.0 mol percent formaldehyde in the treating gas and the duration of the treating period is dependent on the concentration of formaldehyde used. Under these conditions, the treating period required for proper activation of the catalyst at a space velocity of 18 S. C. F. H. (total feed) per pound iron fluidized would vary from about 3 to about 30 hours, the length of the treating period being an inverse function of the concentration of the formaldehyde in the gas contacting the catalyst. Ordinarily, it may be said that the desired effect on the hydrocarbon synthesis catalyst is secured when the proportion of formaldehyde to catalyst being treated ranges from about 0.5 to about 1.0 S. C. F. per pound of catalyst fluidized. Generally speaking, while this proportion represents the minimum ratio of formaldehyde per pound of catalyst that should be used to obtain the desired effect, higher ratios may be employed. However, since I have observed relatively little advantage in employing higher ratios of formaldehyde to catalyst during a single treating step, the above-recited range also constitutes the preferred ratio of formaldehyde to hydrocarbon synthesis catalyst to be used during the treating step.

As the synthesis proceeds, it may become necessary to repeat treatment of the catalyst with formaldehyde, depending of course on the duration of the run. Necessity for repetition of the treatment may be indicated by decreased ratio of alcohols to other chemicals produced. In this regard, if the formaldehyde used in the treating step is not mixed with the synthesis gas, it may be used in conjunction with any of a number of diluent gases. For example, any of the well known inert gases, such as nitrogen, $CO_2$, etc., are satisfactory. Normally gaseous hydrocarbons may likewise be used for this purpose. In fact, it is apparent that any gas will be found suitable as a diluent if it does not react with formaldehyde under the treating conditions utilized or if the catalyst is not adversely affected by said gas. Generally, if it is found desirable to employ gaseous formaldehyde in dilute form, I prefer to use synthesis gas as the diluent.

While treatment of the catalyst is preferably effected at the beginning of or during synthesis operations, the ability of the catalyst to shift chemical distribution to favor increased alcohol production may be accomplished prior to initial contact thereof with synthesis gas. Thus, if desired in the case of an iron hydrocarbon synthesis catalyst, the latter may be treated in the manner herein described before, after, or during the conventional reduction period to which it is normally subjected prior to being placed on stream in contact with synthesis gas. Reduction of the iron oxide may be effected in a conventional hydrocarbon synthesis reactor generally at pressures of from 150 to about 300 p. s. i., at temperatures ranging from 200° to about 700° F., and at linear velocities not in excess of about 0.8 to about 1.0 feet per second. This operation is generally continued until the iron content of the reduced material is at least 75 to 80 weight percent. Ordinarily, it is preferred to reduce the catalyst to an iron content of from about 90 to about 93 weight percent. Promotion of the catalyst with a suitable alkali metal may be effected before or after the reduction step in accordance with any of several procedures now well known to the art. Treatment of the catalyst with formaldehyde prior to the use thereof in hydrocarbon synthesis may be accomplished, if desired, by contacting said catalyst with a small percentage of formaldehyde. This treating gas may be allowed to contact the catalyst under conditions which result in fluidization thereof; for example, at linear velocities of 0.6 to 0.8 feet per second, or the gas may be injected under pressure into a suitable autoclave containing the catalyst. In the latter case, it would be preferred to rotate the autoclave in a horizontal plane in order to assure adequate contact of the treating gas with the catalyst.

The temperature employed during treatment of the catalyst with formaldehyde in accordance with my invention may vary rather widely and, in general, will be found to vary directly with the concentration of formaldehyde in the treating gas and inversely with the length of the treating period. However, in most cases, I have found it is generally desirable to use temperatures ranging from about 200° to about 750° F., with temperatures of from about 575° to about 650° F. being preferred. Pressures of from about atmospheric up to about 450 p. s. i. may be employed. Reactor pressures in the neighborhood of 100 to about 400 p. s. i. are generally preferred.

Treatment of the catalyst in accordance with my invention may also be effected during the so-called activation priod employed in order to continue the hydrocarbon synthesis catalyst for extended periods of efficient performance. Thus, in the conventional hydrocarbon synthesis catalyst conditioning process, a hydrogen-carbon monoxide mixture (total feed) having a relatively high $H_2$:CO ratio, for example, from about 8.1 to about 11.1, contacts a fluidized bed of the catalyst at pressures of the order of from about 15 to about 90 p. s. i., suitably at about 50 to 80 p. s. i., and at a temperature in the neighborhood of at least about 550° F., preferably from about 565° F. Thereafter the pressure is gradually increased, for example, over a period of 8 to 15 hours, to a value of about 100 p. s. i. while the catalyst is contacted with synthesis gas (fresh feed) at the rate of from about 8 to about 25 S. C. F. H. per pound iron and preferably from about 10 to about 15 S. C. F. H. per pound iron. During the increase in pressure to a value above about 100 p. s. i., the temperature is increased to about 600° F. Normal synthesis conditions are then established and the operation may be continued without catalyst fluidization difficulties for extended periods of time, i. e., 600 hours or more. In employing the process of my invention in combination with the above-mentioned catalyst conditioning procedure, formaldehyde is merely injected in the desired concentration into the conditioning gas containing a high ratio of hydrogen to carbon monoxide.

The example appearing below demonstrates the effectiveness of the process of my invention in converting a hydrocarbon synthesis catalyst into one capable of producing alcohols in increased quantities over those obtained by conventional synthesis operations. In the first run described below, a conventional hydrocarbon synthesis operation is carried out to demonstrate the quantity and distribution of oil- and water-soluble chemicals normally obtained. The second run employs the feature of my invention comprising treatment of a fluidized iron hydrocarbon synthesis catalyst with formaldehyde.

In run No. 1, hereinafter referred to as "normal synthesis," the procedure is as follows. Fresh feed having a $H_2$:CO ratio of 1.85 is introduced into a hydrocarbon synthesis reactor containing a finely divided alkali-promoted iron mill scale catalyst. Catalyst is fluidized by injecting the feed at a linear velocity of about 0.5 foot per second and under these conditions the quantity of catalyst present is such that the space velocity is about 4.5 S. C. F. H. (CO) total feed per pound iron fluidized. The temperature and pressure of the reaction zone during synthesis are 650° F. and 400 p. s. i., respectively. The recycle ratio employed is 1:1.

In run No. 2, a 28.5 weight percent solution of formaldehyde and water is vaporized and the resulting vapors mixed with the hydrocarbon synthesis feed described in run No. 1. The conditions employed in this run are otherwise the same as those used in run No. 1. The concentration of formaldehyde in the hydrocarbon synthesis feed is about 0.1 mol percent. Contact of the catalyst with total feed containing 0.1 mol percent formaldehyde is continued for a period of about 30 hours. Under such conditions, the quantity of formaldehyde contacting each pound of fluidized iron amounts to about 0.5 S. C. F., corresponding to a space velocity of 18 S. C. F. H. (total feed) per pound iron fluidized. After the 30-hour treatment, introduction of formaldehyde into the hydrocarbon synthesis feed is discontinued and the synthesis thereafter operated in normal fashion.

In both runs, the total feed CO conversion is 90 percent.

The results given below with respect to run No. 2 are typical of those secured 160–175 hours after treatment of the catalyst in accordance with my invention.

|  | Normal Synthesis (Run No. 1) | Formaldehyde-Treated Catalyst (Run No. 2) |
|---|---|---|
| Selectivity of Converted CO, Percent: |  |  |
| Water-Soluble Chemicals, Total | 7.5 | 9.7 |
| Ethanol | 2.3 | 3.9 |
| 1-Propanol | 0.9 | 1.2 |
| Total Water-Soluble Alcohols | 3.7 | 5.8 |
| Oil-Soluble Chemicals, Total | 9.5 | 9.9 |
| Total Oil-Soluble Alcohols | 3.3 | 4.8 |
| Distribution of Chemicals, Percent: |  |  |
| Alcohols in Water-Soluble Chemicals | 49 | 60 |
| Alcohols in Oil-Soluble Chemicals | 35 | 48 |

From the results given above, it will be seen that by the process of my invention an increase in total water-soluble chemicals content of about 30 percent over that obtained under ordinary synthesis conditions is realized. Also, a 70 percent increase in selectivity to ethanol and a 30 percent increase in selectivity to 1-propanol are secured. Likewise, in accordance with my invention, it is seen that increases in selectivity to oil- and water-soluble alcohols of 45 and 55 percent respectively are obtained over the selectivities to these classes of compounds secured in normal synthesis operation.

While the process of my invention has been described in connection with the examples enumerated above, it should be specifically understood that such invention is not limited thereto. On the contrary, it is intended that the present description and claims be interpreted to cover a process whereby hydrocarbon synthesis catalyst is treated with formaldehyde until said catalyst is procured in a form capable of increasing the selectivity of converted CO to alcohols during hydrocarbon synthesis, discontinuing such treatment of the catalyst with formaldehyde, and thereafter resuming hydrocarbon synthesis under normal conditions. Also, while the present description has been directed primarily to the application of my invention to hydrocarbon synthesis operations employing a fluidized system, it will be apparent and it is intended that my invention cover hydrocarbon synthesis operations wherein the catalyst is employed in the form of a fixed bed.

I claim:

1. In a process for the hydrogenation of carbon monoxide in the presence of a finely divided fluidized bed of an alkali-promoted iron hydrocarbon synthesis catalyst to produce hydrocarbons and valuable oxygenated organic compounds including alcohols, the improvement which comprises contacting said catalyst with formaldehyde in a ratio corresponding to from about 0.5 to about 1.0 S. C. F. per pound of catalyst fluidized at a temperature of from about 575° to about 650° F. and at pressures ranging from about 100 to about 400 p. s. i. to procure said catalyst in a form capable of increasing the selectivity of converted carbon monoxide to alcohols during hydrocarbon synthesis, thereafter discontinuing contacting of said catalyst with formaldehyde, and subsequently establishing predetermined operating conditions for hydrocarbon synthesis in the presence of said catalyst treated as described above.

2. In a process for the hydrogenation of carbon monoxide in the presence of a finely divided fluidized bed of alkali-promoted hydrocarbon synthesis catalyst to produce hydrocarbons and valuable oxygenated organic compounds including alcohols, the improvement which comprises contacting said catalyst during hydrocarbon synthesis with formaldehyde in a ratio corresponding to from about 0.5 to about 1.0 S. C. F. per pound catalyst fluidized under predetermined hydrocarbon synthesis conditions to procure said catalyst in a form capable of increasing the selectivity of converted carbon monoxide to alcohols, discontinuing contacting of said catalyst with formaldehyde, and thereafter effecting hydrocarbon synthesis under known conditions.

3. The process of claim 2 in which the catalyst employed is iron.

4. In a process for the hydrogenation of carbon monoxide in the presence of a finely divided fluidized bed of an alkali-promoted iron hydrocarbon synthesis catalyst to produce hydrocarbons and valuable oxygenated organic compounds including alcohols, the improvement which comprises, prior to establishing predetermined hydrocarbon synthesis operating conditions, contacting said catalyst with formaldehyde in a ratio corresponding to from about 0.5 to about 1.0 S. C. F. per pound catalyst fluidized at temperatures ranging from about 350° to about 750° F. and at pressures ranging from about atmospheric to about 450 p. s. i. to procure said catalyst in a form capable of increasing the selectivity of converted carbon monoxide to alcohols during hydrocarbon synthesis, thereafter discontinuing contacting of said catalyst with formaldehyde, and subsequently establishing predetermined operating conditions for hydrocarbon synthesis in the presence of said catalyst treated as described above.

5. In a process for the hydrogenation of carbon monoxide in the presence of a fluidized bed of finely divided alkali-promoted iron catalyst to produce hydrocarbons and valuable oxygenated organic compounds including water-soluble alcohols, the improvement which comprises increasing the proportion of said alcohols over that secured by normal synthesis operation by first contacting said fluidized bed of catalyst with formaldehyde in a ratio corresponding to from about 0.5 to about 1.0 S. C. F. per pound iron fluidized at temperatures ranging from about 350° to about 750° F. and at pressures ranging from about atmospheric to about 450 p. s. i. to procure said catalyst in a form capable of increasing the selectivity of converted carbon monoxide to alcohols during hydrocarbon synthesis, and thereafter discontinuing contacting of said catalyst with formaldehyde and subsequently establishing predetermined operating conditions for hydrocarbon synthesis in the presence of said catalyst treated as described above.

6. In a process for the hydrogenation of carbon monoxide in the presence of a fluidized bed of finely divided alkali-promoted iron catalyst to produce hydrocarbons and valuable oxygenated organic compounds including water-soluble alcohols, the improvement which comprises increasing the proportion of said alcohols over that secured by normal synthesis operation by first contacting said fluidized bed of catalyst with formaldehyde in a ratio corresponding to from about 0.5 to about 1.0 S. C. F. per pound iron fluidized under hydrocarbon synthesis conditions and in the presence of carbon monoxide and hydrocarbon present in synthesis proportions to procure said catalyst in a form capable of increasing the selectivity of converted carbon monoxide to alcohols during hydrocarbon synthesis, and thereafter discontinuing contacting of said catalyst with formaldehyde and subsequently establishing predetermined operating conditions for hydrocarbon synthesis in the presence of said catalyst treated as described above.

7. In a process for the production of hydrocarbons and valuable oxygenated organic compounds including alcohols, by reacting a mixture of hydrogen and carbon monoxide in the presence of an alkali-promoted hydrocarbon synthesis catalyst in a synthesis zone, the improvement which comprises adding formaldehyde to said mixture in a concentration of from about 0.1 to about 1.0 mol percent, thereafter contacting said catalyst with the resulting mixture in said zone at a temperature of from about 200° to about 750° F. and at a pressure of from about 100 to about 400 p. s. i., thereafter discontinuing contacting of said catalyst with said resulting mixture, and subsequently establishing predetermined operating conditions for hydrocarbon synthesis in the presence of said catalyst treated as described above.

8. The process of claim 7 in which the formaldehyde is added to an inert gas to produce said resulting mixture and the temperature employed ranges from about 575° to about 650° F.

9. In a process for the hydrogenation of carbon monoxide in a reaction zone in the presence of an alkali-promoted hydrocarbon synthesis catalyst to produce hydrocarbons and valuable oxygenated organic compounds including alcohols, the improvement which comprises periodically injecting gaseous formaldehyde into said zone during said hydrogenation under known conditions of hydrocarbon synthesis.

10. In a process for the hydrogenation of carbon monoxide in a reaction zone in the presence of an alkali-promoted hydrocarbon synthesis catalyst under known conditions for hydrocarbon synthesis to produce hydrocarbons and valuable oxygenated organic compounds including alcohols, the improvement which comprises injecting a mixture of an inert gas and gaseous formaldehyde, the latter being present in said mixture in a concentration of about 0.1 to about 1.0 mol percent, into said zone during said hydrogenation and discontinuing injection of said mixture after the selectivity of said catalyst to alcohols has been increased.

References Cited in the file of this patent

UNITED STATES PATENTS

| | | |
|---|---|---|
| 2,000,096 | Prudhomme | May 7, 1935 |
| 2,671,814 | Mertzweiller | Mar. 9, 1954 |